Figure 1:
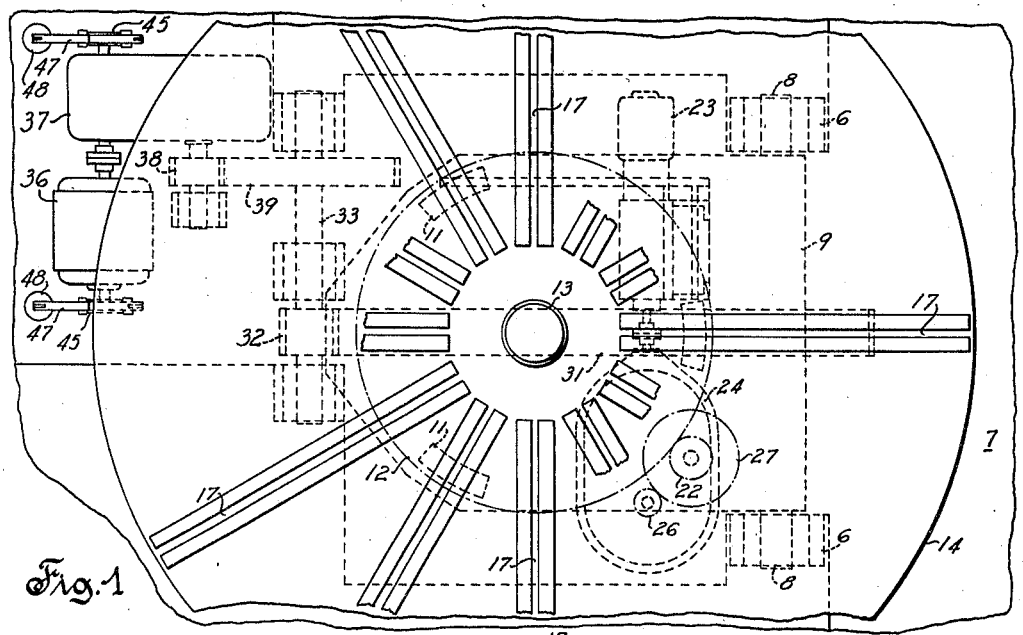

May 12, 1942.  G. F. JOHNSTON  2,283,140

WELDING WORK POSITIONER

Filed Feb. 28, 1941   2 Sheets-Sheet 1

Inventor
G. F. Johnston
By Miles Henninger
Attorney

Patented May 12, 1942

2,283,140

UNITED STATES PATENT OFFICE 2,283,140

WELDING WORK POSITIONER

George F. Johnston, Elm Grove, Wis., assignor to Allis-Chalmers Manufacturing Company, Milwaukee, Wis., a corporation of Delaware Application February 28, 1941, Serial No. 381,016

1 Claim. (Cl. 219—17)

This invention relates to devices for holding and positioning structures to be welded and particularly to power driven welding work positioners for continuously rotating and for tilting work, in either direction and at any speed, into position for horizontally welding with safety to the welding machine operator.

The fabrication of large steel structures by welding of the several parts thereof is expensive and difficult whether such welding is done automatically or by hand. Automatic welding requires that some means be provided by which work can be brought to the welding electrode at a predetermined rate which must be variable dependent upon the welding being done, and hand welding requires that the operator frequently change his position or the position of the work itself. When structures of the order of fifty tons are being welded, the usual use of a crane for positioning the work does not provide such control of movement of the work as permits the use of automatic welding and even hand welding must frequently be done in vertical or overhead positions and at great height from the floor when only a crane is available. The welding operation is therefore difficult and expensive because slow and it may be very dangerous to the operator.

If a turntable is provided for holding the work and such turntable is mounted for tilting, the work can always be brought into horizontal position for welding, and if the table is mounted so that a portion of the table drops below the floor level when the table is tilted, the work can always be brought to a convenient and safe position near floor level. For use with automatic welding, the table must be rotated at a definite speed in either direction, dependent on the size of the material to be welded and the radius on which the weld is to be made. Such required speed has been found in practice to vary from .008 R. P. M. upwards to .23 R. P. M. Means must, of course, be provided to hold the table in any position to which it has been rotated or tilted and for preventing the table from moving beyond a predetermined position.

It is therefore an object of the present invention to provide a power driven device for positioning the work to be welded, by rotation and tilting of the work holding device.

Another object of the invention is to provide a welding work positioner in which the work may be continuously rotated in either direction to permit automatic welding of the work.

Another object of the invention is to provide a welding work positioner in which the work may be continuously rotated at any desired rate of speed which is variable at any time.

Another object of the invention is to provide a power driven welding work positioner in which the work to be welded is movable into positions permitting welding with greatest convenience and safety to the welding operator.

Another object of the invention is to provide a welding work positioner in which the work to be welded may be positioned to permit horizontal placing of all welds and to avoid all vertical and overhead welding operations.

Another object of the invention is to provide a welding work positioner in which automatic means are provided to prevent undesired movement of the positioner from any position to which it has been turned or tilted.

Another object of the invention is to provide a power driven welding work positioner in which the electric welding current is grounded by way of a path keeping such current away from all parts of the device not designed to carry current.

Figure 2:
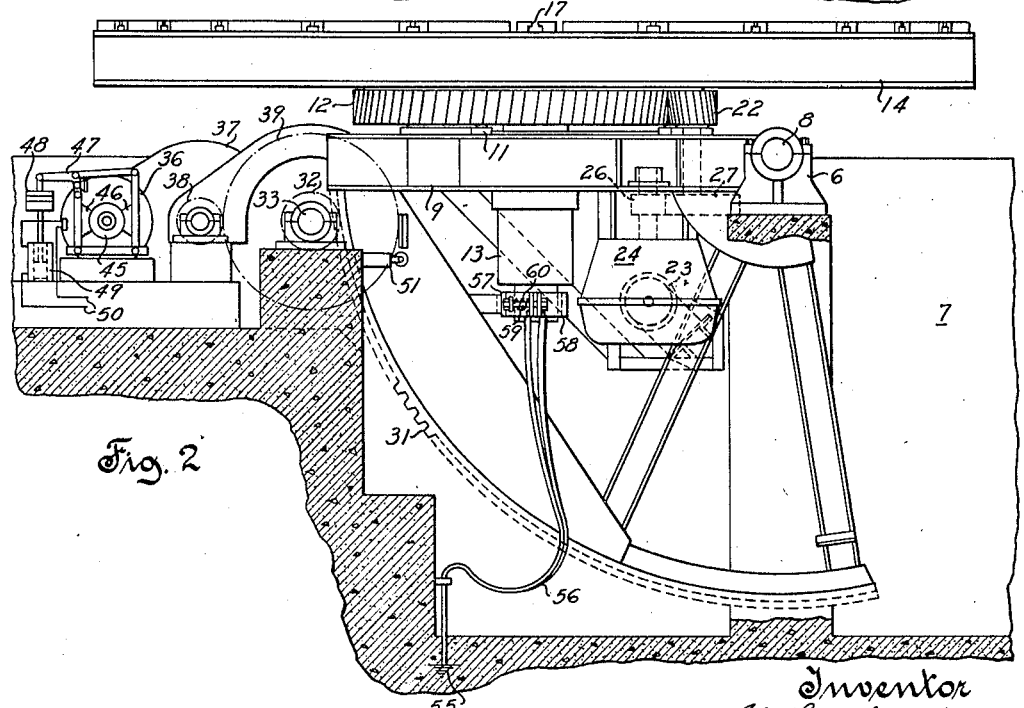
Figure 3:
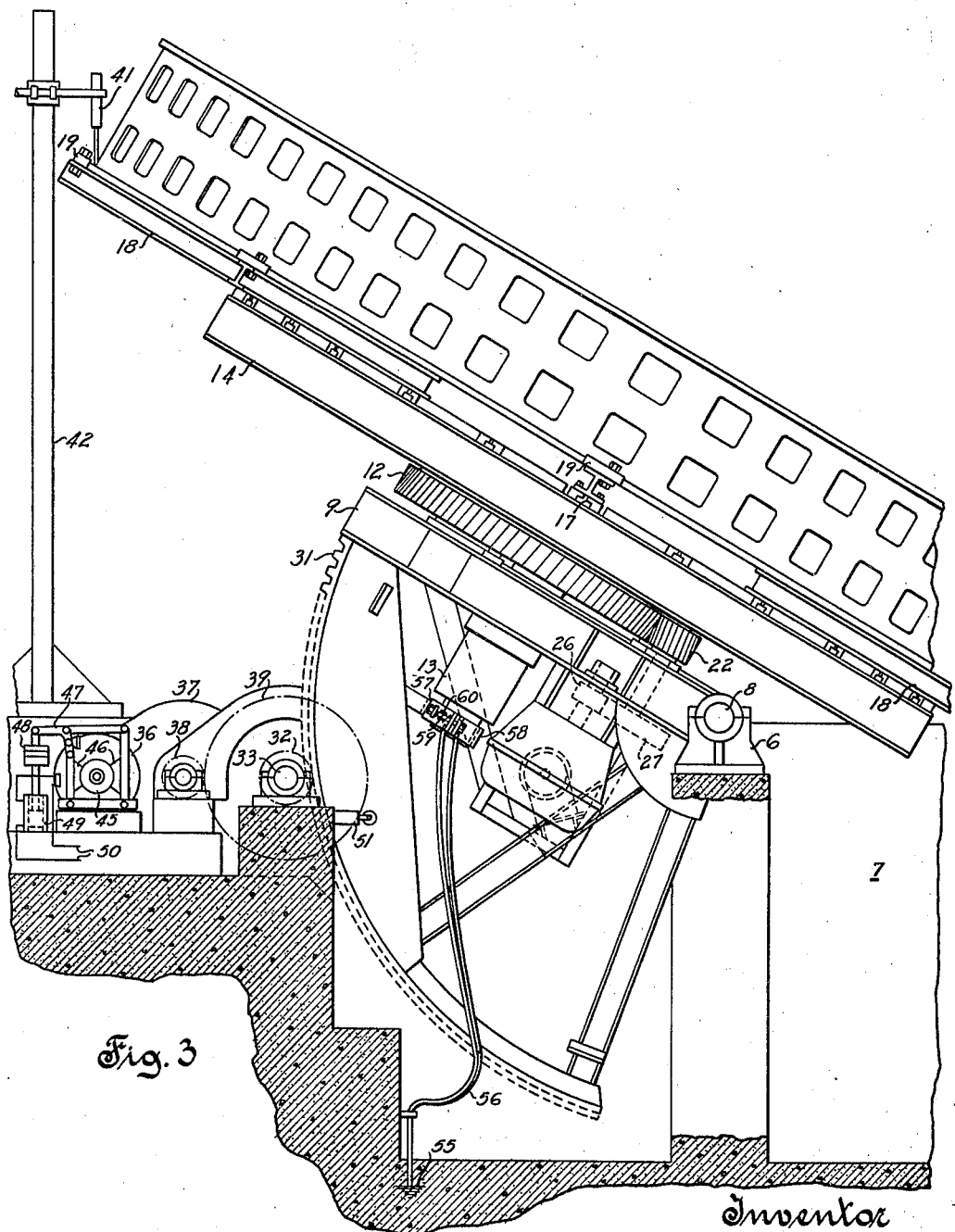

Objects and advantages other than those above set forth will be apparent from the following description when read in connection with the accompanying drawings, in which:

Fig. 1 is a view looking down on the top of the table of a welding work positioner to show the means for applying extension arms to the table top to increase its work holding area and to indicate the arrangement of the driving means for tilting the table and for rotating the table, respectively;

Fig. 2 is a side elevation showing the table in horizontal position to further illustrate the driving means for tilting the table and for holding the table in any desired tilted position, to further illustrate the means for rotating the table and to illustrate the structure for electrically grounding the table to complete the circuit for electric welding machines; and Fig. 3 is a side elevation showing the table tilted to a thirty degree position and loaded with a structure of greater diameter than the table and hence requiring the use of extension arms to support and clamp the parts of the structure in the desired position and indicating the manner in which the electrode of an automatic welding machine may be positioned for making peripheral welds on the structure on the table.

Referring more particularly to the drawings by reference numerals, numeral 6 designates one of a pair of pedestal bearings mounted on the side, midway between the top and the bottom of a pit 7 which is approximately twelve feet deep and thirty feet wide. The bearings 6 support a horizontal axle 8 on which is fastened a frame 9 in which is mounted a thrust bearing of the type having the well-known tilting shoes 11. The thrust bearing shoes 11 support a large helical gear 12 mounted on a rotatable pivot or king-pin 13 extending through the frame 9. The gear 12 has fastened thereon at one side thereof, a circular table 14 which is preferably of such diameter as to accommodate the major portion of the work to be done on it and is provided on the top thereof with a plurality of pairs of radially extending bars spaced from each other to form T-slots to receive bolts and providing work holders 17 for receiving extension arms 18 or clamps 19 to hold portions of the structure to be welded, on the table regardless of the position of the table. Arms 18 may extend from the periphery of the table any desired distance limited only by the strength of the table and its supporting structure, and the clamps 19 may be mounted in the work holders 17 or on the arms 18 at any desired distance from the center of the table. Work holders 17, extension arms 18, which, as shown, extend about five feet from the periphery of the table, and clamps 19 thus provide means for securely clamping all portions of the structure to be welded, at a plurality of points to retain such parts in the precise position required for proper welding regardless of the number or size of such parts.

Table 14 is rotatable about the king-pin 13 by a power drive which includes a helical gear pinion 22 mounted in the frame 9 for meshing with the helical gear 12 and extending through the frame for connection with the other portion of the drive. The drive for the pinion 22 comprises an electric motor 23 which operates a variable speed transmission unit 24 of the well-known "Oilgear" hydraulic type such as shown in U. S. Patent 1,998,984 to Walter Ferris, April 23, 1935, but with a constant displacement hydraulic motor. Transmission 24 drives a gear pinion 26 which meshes with a gear 27 mounted on the shaft of the helical pinion gear 22. The motor 23 is preferably controlled by the usual portable push-button station (and therefore not shown) which the welder may keep beside himself regardless of his position relative to the work and the positioner. The drive above described is capable of rotating the table 14, in either forward or reverse direction and at any desired speed, and without any limit as to the amount of angular motion, and due to the use of the helical gear and the hydraulic transmission, allows rotation of the table uniformly and not by intermittent step-wise movement only. Automatic welding is thus facilitated as it has been found in practice to be able to get smooth continuous rotation of the table at any speed varying from .008 to .23 R. P. M. Use of helical gears and the hydraulic transmission also prevents undesired reversibility of the drive which is important if the table is tilted with an eccentric load of parts to be welded, without preventing reversibility of the table whenever desired.

The main frame 9 has fastened thereon, a gear sector 31 which extends downwardly from the frame 9 into the pit 7 on a vertical plane preferably through the center of the table and midway between the bearings 6. The gear 31 meshes with a gear 32 mounted on a shaft 33 extending at right angles to the plane of the gear sector 31. The driving gear 32 is operated by a drive comprising a motor 36 driving through gear speed reducer 37 which in turn drives a pinion gear 38 meshing with a large gear 39 keyed on the shaft 33. The operation of the above described drive allows tilting of the table 14 about the axle 8 to any desired position between horizontal and vertical position of the table. Fig. 3 shows the table tilted to thirty degrees to support a structure to be welded which is of greater diameter than the table and hence requires the use of the extension arms 18. Fig. 3 also shows an electrode 41 of an automatic welding machine mounted on a support 42 to weld a peripheral seam on the structure shown in Fig. 3 while the table is being continuously rotated.

The table tilting motor 36 and the speed reducer 37 are each provided, at one end of their coaxial shafts, with brake drums 45 adapted to be engaged by pairs of brake shoes 46 mounted on leverages 47. The leverages 47 are weighted at 48 to bias the shoes 46 toward engaging position with the drums 45. The solenoids 49 are connected in series with the circuit 50 of the tilting motor 36 and are energized when the motor is operated to raise the armatures of the solenoids 49, thus drawing the shoes 46 away from the drums 45. The shoes are brought into contact with the drums upon any deenergization of the solenoids 49 which allow the armatures and weights 48 to drop and pull shoes 46 against drums 45. The table 14 is therefore automatically retained in any desired tilted position merely by the deenergization of the tilting motor 36 which is preferably controlled from the same portable push-button station as used to control the table rotating motor 23. It is therefore possible to use automatic welding on irregular shapes which require changes of both rotating speed and the degree of tilt during the welding operation.

The tilting motor 36 has several safety switches 51 connected in the circuit thereof to deenergize the motor and solenoids 49 if the table should move beyond a predetermined position from any tilted position. Deenergization of the solenoids 49 sets the brakes as above described. The safety switches 51 are of the well-known hatchway type and are merely indicated in the drawings and not shown in detail.

When electric welding is used, the welding current flows to ground through the table and such welding current may amount to a thousand amperes or more, depending on the thickness of the weld being made. Current of such magnitude must be carefully handled and must particularly be kept away from bearing surfaces and other portions of the structure not designed to carry such current. The table must therefore be grounded as indicated at 55 through cables capable of carrying such current and the cable connection must be made as directly to the table top as possible. Due to the desired capability for continuous rotation, the cables 56 are connected to the king-pin 13 by way of a clamp having a fixed position portion 57 and a removable portion 58, the two portions being held together by springs 59 acting on bolts 60. The king-pin is designed of sufficient size to carry the quantity of current required even though not made of good conductive material, but the clamp 57, 58 is relatively small and is made of relatively good conductive material and contacts under spring pressure with rings of good conductive material mounted on the king-pin under the clamps and therefore not shown in the drawings. With the above structure, the cables 56 need be only flexible enough to permit tilting of the table and are relieved of any strain due to rotation of the table.

It will therefore be seen that the present invention provides a device for positioning structures to be welded in such manner as to provide rapid and safe welding either by automatic welding or by hand welding. Due to the mounting of the table 14 in the pit 7, large structures to be welded on the table are brought close to the floor level about the pit, thus providing the most convenient and safest position for hand welding and avoiding the danger and effort of handling long hoses or cables at a dangerous height from the floor which has been responsible for many injuries to welders. The thrust bearing shoes 11, are capable of supporting all thrust loads regardless of whether the table is in a horizontal or tilted position and without any difficulty in lubrication to date in use of the table illustrated. The combination of a hydraulic transmission means and helical gearing provides means for securing smooth and continuous rotary movement of the table in either direction at any speed required for automatic welding of any weight of material at any radial distance from the center of the table and automatically holds the table in any desired position. The sector gear and its drive for tilting the table are designed to hold as much as three hundred thousand foot pounds (equivalent to fifty tons at three feet from the center of the table in vertical position) at any tilted position, and such drive is automatically retained in any desired position, thus avoiding the possibility of damage to the machine or danger to the operator by movement out of any tilted position. Grounding of the welding current through the king-pin provides a definite path for current flowing through the table away from the bearings and other parts not designed to carry current, and thus avoids the danger of damage to such parts. The connection of the ground to the king-pin by way of a slip-ring structure allows for continuous rotation of the table even though relatively stiff cables are required to carry large welding currents to ground.

Although but one embodiment of the present invention has been illustrated and described, it will be apparent that many changes and modifications may be made therein within the scope of the appended claim and without departing from the spirit of the invention disclosed.

It is claimed and desired to secure by Letters Patent:

In a device for positioning a structure to be welded, a horizontal axle, a frame mounted on said axle for movement thereabout, power driven means for tilting said frame about said axle, an electrically conductive king-pin rotatably mounted on said frame, a table mounted in electrically conductive relation on said king-pin, power driven means for rotating said table in either direction and to any extent, current carrying contact means mounted on said frame and slidably engaging said king-pin, and an electrically conductive cable connecting said contact means with ground whereby substantially the entire welding current passes to ground directly through the structure to be welded, said table, said king-pin, said contact means and said cable.

GEORGE F. JOHNSTON.